US006326335B1

(12) United States Patent
Kowalski et al.

(10) Patent No.: US 6,326,335 B1
(45) Date of Patent: *Dec. 4, 2001

(54) MICROENCAPSULATED OIL FIELD CHEMICALS

(75) Inventors: Thomas Charles Kowalski, Ennis; Robert Wayne Pike, Houston, both of TX (US)

(73) Assignee: Corsicana Technologies, Inc., Corsicana, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/360,370

(22) Filed: Jul. 13, 1999

Related U.S. Application Data

(63) Continuation of application No. 07/878,940, filed on May 5, 1992, now Pat. No. 5,922,652.

(51) Int. Cl.$^7$ .................................................... C09K 3/00
(52) U.S. Cl. .................. 507/241; 507/244; 507/239; 507/261; 507/902; 507/939; 264/4.3; 428/402.2
(58) Field of Search ..................................... 507/241, 244, 507/239, 261, 902, 939, 129, 131, 133; 264/4.3; 428/402.2

(56) References Cited

U.S. PATENT DOCUMENTS

| 3,666,678 | * | 5/1972 | Mosier et al. | 507/239 |
| 3,676,363 | * | 7/1972 | Mosier | 507/241 |
| 5,068,042 | * | 11/1991 | Hen | 507/241 |
| 5,112,505 | * | 5/1992 | Jacobs et al. | 507/241 |

* cited by examiner

*Primary Examiner*—Philip Tucker
(74) *Attorney, Agent, or Firm*—Bracewell & Patterson, L.L.P.

(57) ABSTRACT

Gelatin capsules containing oil field chemicals, preferably weighted with a heavy metal compound, are made more stable under certain conditions by the incorporation of a strong chelating agent. The microcapsules can provide an extended treatment period since many materials that would damage the microcapsules are controlled by the chelating agent.

11 Claims, No Drawings

MICROENCAPSULATED OIL FIELD CHEMICALS

This application is a continuation of Ser. No. 07/878,940 filed May 5, 1992, now U.S. Pat. No. 5,922,652.

TECHNICAL FIELD

This invention relates to compositions and processes for treating oil wells.

BACKGROUND OF THE INVENTION

Conditions which adversely affect the production of oil from a well include: (1) the deposition of plugging materials brought out during production (e.g., formation of "scale"); and (2) corrosion of the well tubing and operating equipment in the well. Treatment of a well by introducing an oil field chemical can increase the rate of production, prolong the producing life, and lessen the deterioration of well equipment.

However, it is difficult to treat the individual wells which are widely dispersed geographically, which are inaccessible during operation, and which contain fluids of widely varying composition.

One moderately successful approach is disclosed in U.S. Pat. No. 3,676,363, Mosier, issued Jul. 11, 1972, said patent being incorporated herein by reference. The capsules disclosed therein are weighted. The capsules are deposited in the sump of a well where they slowly dissolve. Microencapsulation of various hydrophobic liquids is well known. Microcapsules have been suggested for encapsulation of perfumes, medicines, adhesives, dyestuffs, inks, etc.

SUMMARY OF THE INVENTION

It has now been discovered that the walls of microencapsulated oil field chemicals of the type described in U.S. Pat. No. 3,676,363, supra, said patent being incorporated herein by reference, are susceptible to damage, by many materials present in some ground waters, e.g., high brine contents and relatively large amounts of certain cations, and that, surprisingly, incorporation of strong chelating agent, like ethylenediaminetctraacetic acid, stabilizes the capsule wall so that extended release of the oil well chemical is possible.

DETAILED DESCRIPTION OF THE INVENTION

Strong Chelating Agent

The strong chelating agents are incorporated into the microcapsules herein by addition to either the aqueous solution or the water-immiscible solvent used to form the microcapsules as described hereinafter. Useful chelating agents include the acid forms of compounds known to complex heavy metals. Many such compounds are used in detergent compositions, typically as their salts.

Polycarboxylate materials useful herein, especially in the said preferred compositions, include the acid forms, or salts, of builders disclosed in U.S. Pat. No. 4,915,854, Mao et al., issued Apr. 10, 1990, and U.S. Pat. No. 4,704,233, Hartman and Perkins, issued Nov. 3, 1987, said patents being incorporated herein by reference. Suitable materials preferably have relatively strong binding constants for heavy metals under both acid and alkaline conditions. Preferred materials have the generic formula:

wherein each $R^5$ is selected from the group consisting of H and OH and n is a number from about 2 to about 3 on the average. Other preferred materials include the acids, and salts, described in the copending U.S. patent application Ser. No. 07/587,477 of Stephen Culshaw and Eddy Vos for "Hard-Surface Cleaning Compositions," filed Sep. 19, 1990, said patent application being incorporated herein by reference.

In addition to the above materials, other materials include the acid forms of those disclosed in U.S. Pat. No. 4,769,172, Siklosi, issued Sep. 6, 1988, and incorporated herein by reference. Still others include the chelating agents having the formula:

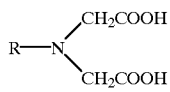

wherein R is selected from the group consisting of:

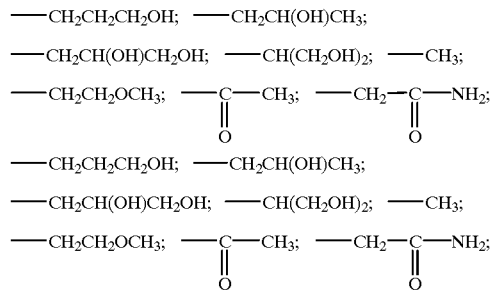

—$CH_2CH_2CH_2OCH_3$; —$C(CH_2OH)_3$; and mixtures thereof.

Chemical names of the acid form of some of the suitable chelating agents herein include:

N(3-hydroxypropyl)imino-N,N-diacetic acid (3-HPIDA);
N(-2-hydroxypropyl)imino-N,N-diacetic acid (2-HPIDA);
N-glyeerylimino-N,N-diacetic acid (GLIDA);
dihydroxyisopropylimino-(N,N)-diacetic acid (DHPIDA);
methylimino-(N,N)-diacetic acid (MIDA);
2-methoxyethylimino-(N,N)-diacetic acid (MEIDA);
amidoiminodiacetic acid (also known as sodium amidonitrilotriaeetic, SAND);
cetamidoiminodiacetic acid (AIDA);
3-methoxypropylimino-N,N-diacetic acid (MEPIDA); and
tris(hydroxyrnethyl)methylimino-N,N-diacetic acid (TRIDA).

Methods of preparation of the iminodiacetic derivatives herein are disclosed in the following publications:

Japanese Laid Open publication 59-70652, for 3-HPIDA;
DE-OS-25 42 708, for 2-HPIDA and DHPIDA;
Chem. ZVESTI 34(1) p. 93–103 (1980), Mayer, Riecanska et al., publication of Mar. 26, 1979, for GLIDA;
C.A. 104(6)45062 d for MIDA; and
Biochemistry 5, p. 467 (1966) for AIDA.

Still other chelating agents comprise amino polycarboxylates like nitrilotiiacetic acid, ethylene diamine tetraacetic acid, polyethyleneamine polyacetic acids, etc.

The chelating agents of the invention are preferably present at levels of from about 2% to about 14% of the total composition, more preferably from about 3% to about 12%, even more preferably from about 5% to about 10%.

Preparation of Microcapsule

The microcapsules of this invention can be prepared by any procedure or variation thereof wherein an oil field chemical is dispersed in a water-immiscible solvent, and then emulsified with an aqueous solution containing one or more macro colloids which are capable of undergoing simple or complex coacervation. In the process of coacervation, one or more of the macro colloids deposits itself around the dispersed droplets of the water-immiscible solvent and treating agent. The droplets are thereby completely encapsulated and sealed. Various techniques for accomplishing such microencapsulation by coacervation are well known in the art, and provide the technical means for preparing the particular novel microcapsule compositions which can be used in practicing the method of the present invention. For example, there can be employed the encapsulation techniques described in U.S. Pat. No. 2,800,457 (Re. 24,899), Green et al.; U.S. Pat. No. 2,800,458, Green, issued Jul. 23, 1957; U.S. Pat. No. 3,159,585, Evans et al., issued Dec. 1, 1964; U.S. Pat. No. 3,533,958, Yurkowitz, issued Oct. 13, 1970; U.S. Pat. No. 3,697,437, Fogle et al., issued Oct. 10, 1972; U.S. Pat. No. 3,888,689, Maekawa et al., issued Jun. 10, 1975; Brit. Pat. 1,483,542, published Aug. 24, 1977; U.S. Pat. No. 3,996,156, Matsukawa et al., issued Dec. 7, 1976; U.S. Pat. No. 3,965,033, Matsukawa et al., issued Jun. 22, 1976; and U.S. Pat. No. 4,010,038, Iwasaki et al., issued Mar. 1, 1977, etc., all of said patents being incorporated herein by reference.

Other techniques and materials for forming microcapsules are disclosed in U.S. Pat. No. 4,016,098, Saeki et al., issued Apr. 5, 1977; U.S. Pat. No. 4,269,729, Maruyama et al., issued May 26, 1981; U.S. Pat. No. 4,303,548, Shimazaki et al., issued Dec. 1, 1981; U.S. Pat. No. 4,460,722, Igarashi et al., issued Jul. 17, 1984; and U.S. Pat. No. 4,610,927, Igarashi et al., issued Sep. 9, 1986, all of said patents being incorporated herein by reference.

These preferred procedures utilize a complex hydrophilic colloid material, such as gelatin, to encapsulate water-immiscible droplets of an oil-in-water type emulsion. Besides gelatin, other hydrophilic colloids can be used, including albumen, alginates such as sodium alginate, casein, agaragar, starch, pectins, carboxymethyl cellulose, Irish moss and gum arabic.

The wall materials are those typically used to form microcapsules by coacervation techniques. The materials are described in detail in the following patents incorporated herein by reference, e.g., U.S. Pat. Nos. 2,800,458; 3,159,585; 3,533,958; 3,697,437; 3,888,689; 3,996,156; 3,965,033; 4,010,038; and 4,016,098. The preferred encapsulating material is gelatin, either precipitated by a salt, e.g., sodium sulfate or ammonium sulfate, or coacervated with a polyanion such as gum arabic and more preferably cross-linked with a cross-linking material such as formaldehyde or glutaraldehyde.

Preferred gelatin is Type A (acid precursor), preferably having a Bloom strength of 300 or, less preferably, 275, then by increments of 25, down to the least preferred 150.

Simple coacervation can be accomplished as described in U.S. Pat. Nos. 2,800,457, Green et al.; 2,800,458, Green et al.; and 3,594,327, Beescy, all of said patents being incorporated herein by reference.

For complex coacervation, gum arabic is a preferred polyanionic material for inducing coacervation of, e.g., gelatin. A spray dried grade of gum arabic is preferred for purity. Other polyanionic materials can be used in place of the gum arabic. Polyphosphates, alginates (preferably hydrolyzed), carrageenan, carboxymethylcellulose, polyacrylates, silicates, pectin, Type B gelatin (at a pH where it is anionic), and mixtures thereof, can be used to replace the gum arabic, either in whole or in part, as the polyanionic material.

Other preferred parameters for complex coacervation, in addition to suitable agitation, include: (1) the use of from about 5 to about 25, preferably from about 6 to about 15, more preferably from about 7 to about 12, and even more preferably from about 8 to about 10, grams of gelatin per 100 grams of oil field chemical that is encapsulated; (2) the use of from about 0.4 to about 2.2, preferably from about 0.6 to about 1.5, more preferably from about 0.8 to about 1.2, grams of gum arabic (or an amount of another suitable polyanion to provide an approximately equivalent charge) per gram of gelatin; (3) a coacervation pH of from about 2.5 to about 8, preferably from about 3.5 to about 6, more preferably from about 4.2 to about 5, and even more preferably from about 4.4 to about 4.8. (The pH range is adjusted to provide a reasonable balance between cationic charges on the gelatin and anionic charges on the polyanion.) (4) effecting the coacervation reaction in an amount of deionized water that is typically from about 15 to about 35, preferably from about 20 to about 30, times the amount of the total amount of gelatin and polyanionic material used to form the capsule walls. Deionized water is highly desirable for consistency since the coacervation reaction is ionic in nature; (5) using a coacervation temperature between about 30° C. and about 60° C., preferably between about 45° C. and about 55° C.; (6) after the desired coacervation temperature is reached, using a cooling rate of from about 0.1° C. to about 5° C., preferably from about 0.25° C. to about 2° C. per minute. The cooling rate is adjusted to maximize the time when the coacervate gel walls are being formed. For example, polyphosphate anions form coacervates that gel at higher temperatures, so the cooling rate should be kept slow at first and then speeded up. Gum arabic forms coacervates that gel at lower temperatures, so the cooling rate should be fast at first and then slow.

The gelatin or gelatin/polyanion (preferably gum arabic) wall is preferably cross-linked. The preferred cross-linking material is glutaraldehyde. Suitable parameters, in addition to suitable agitation, for cross-linking with glutaraldehyde are: (1) the use of from about 0.05 to about 2.0, preferably from about 0.5 to about 1, grams of glutaraldehyde per 10 grams of gelatin; (2) cooling the microcapsule slurry to a temperature of less than about 10° C. and letting it remain there for at least about 30 minutes before adding the glutaraldehyde. The slurry is then allowed to rewarm to ambient temperature; (3) keeping the pH below about 5.5 if the cross-linking reaction is over about 4 hours in length (higher pH's and/or temperatures can be used to shorten the reaction time); (4) excess glutaraldehyde is removed to avoid excessive cross-linking by washing with an excess of water, e.g., about 16 times the volume of the capsule slurry. Other cross-linking agents such as urea/formaldehyde resins, tannin materials such as tannic acid, and mixtures thereof can be used to replace the glutaraldehyde either in whole or in part.

The method of well treatment in the present invention is essentially that of U.S. Pat. No. 3,676,373, incorporated hereinbefore, which utilizes a deposit of the microcapsules at the bottom of a well sump, which are contacted with the produced fluids containing an aqueous phase as a means of introducing the treating agent into the water. For example, a portion of the deposited material in contact with the incoming produced fluids, such as the upper layer of the deposit, is subjected to the action of the aqueous phase, which gradually destroys the microcapsule wall, and thereby permits the treating agent contained within the capsules to be carried with the produced fluids stream. In order to prevent this process from proceeding too rapidly and to maintain the deposited supply of the microcapsules, the capsules are prepared to have a specific gravity substantially greater than that of the water or the flowing stream. Speaking generally, the microcapsules of this invention will preferably have a specific gravity of from about 1.3 to about 2.6. Where the flowing stream is water, a brine, or a mixture of oil and brine, it will usually be preferable for the microcapsular material to have a specific gravity of about 1.5 to about 1.8.

The required ingredients of the microcapsule wall, the water-immiscible solvent, and the treating agent, do not combine to produce a microcapsule having the desired, relatively high specific gravity, therefore, the microcapsules incorporate a weighting agent as an essential constituent. Since the microcapsules are in the micron size range (e.g., 30–40 micron diameter), the weighting agent should be in the form of a very finely divided material, such as a finely ground powder. For example, powders having an average size of less than 10 microns can be used, while powders having an average particle diameter of about 1–3 microns are particularly desirable.

While various finely divided materials can be used as weighting agents, it is preferred to employ a metal compound, such as a metal salt, oxide, or hydroxide. Polyvalent metal compounds are particularly suitable because of the high specific gravity of such compounds and their generally low solubility in water. For example, such polyvalent metal compounds include barium sulfate, lead oxide, zinc oxide, lead chloride, iron sulfide, etc. However, other metal compounds can be used. The metal compound should have a specific gravity of at least 2.5 and preferably about 3.0. Metal compounds having specific gravities within the range of about 4.5 to about 10.0 are particularly advantageous. It will be understood that many metal and polymetal compounds can be employed. In general, metal compounds of relatively low solubility in water can be used most efficiently, since the amount lost to the aqueous phase will be small. For example, metal compounds having a maximum solubility in water of less than about 1% at 25° C., are suitable, while a solubility below 0.5% is usually preferred. However, metal compounds having greater solubilities can be used.

The weighting compound in the form of a finely divided powder can be very easily incorporated in the capsule materials. One convenient procedure is to mix the finely divided powder with the oil-in-water type emulsion prior to the formation of the protective colloid films around the dispersed droplets. The finely divided powder tends to function as an auxiliary wetting agent, and will therefore tend to collect at the interfaces between the dispersed droplets and the continuous aqueous phase. When the films of the macro colloid are formed around the droplets, the weighting material at the interface is trapped and held in the capsules. If it is desired to further disperse the weighting agent within the droplets themselves, this can be accomplished by the process described in U.S. Pat. No. 3,666,678, of Mosier and Tippett, issued May 30, 1972, said patent being incorporated herein by reference. With this particular procedure, one can incorporate a maximum amount of the weighting agent in the encapsulated material. However, any coacervation encapsulation carried out in the presence of a finely divided metal compound of the character described will result in the incorporation of a considerable percentage of the compound in the capsules, and thereby increase the weight of the capsules.

The capsules can contain a smaller or larger amount of the weighting agent, depending upon the desired final weight of the capsules. For example, the capsules may contain from 5–75% by weight of the weighting agent. However, for most purposes, the capsules will usually contain at least about 10%, but not over about 50%, of the weighting agent. Lesser amounts of the weighting agent usually do not contribute sufficiently to the desired increase in amount, while larger quantities may make it difficult to incorporate the desired amount of the water-immiscible solvent and treating agent contained therein.

By following the procedure just described, microcapsule compositions having a specific gravity within the range of about 1.3–2.0 can readily be produced. For oil field applications, where saline brines are encountered having specific gravities as high as 1.2–1.3, it is preferred that the microcapsules have a specific gravity above about 1.5, such as a specific gravity within the range of about 1.5–1.8. Where it is desired to obtain this result, an excess of the weighting agent can be incorporated in the emulsion. The quantity which will be incorporated in the microcapsule composition is limited by the extent of the interfacial area between the droplets and the aqueous phase. Consequently, the excess of the weighting agent which is not embedded in the droplets or dissolved in the aqueous solution will remain suspended in the supernatant aqueous solution and can be separated therefrom. For example, from about 0.5 to about 1.5 parts of the the weighting agent per part by weight of the dispersed phase (water-immiscible solvent and treating agent) can be used. Where the weighting agent is alkaline in nature, the emulsion can be carried through a pH change to the acid side without interfering with the desired function of the weighting agent so long as the resulting product is compatible. It will be understood, however, that such a modification depends upon the specific application to be made of the microcapsular material. Usually, however, it will not be desirable to employ a completely insoluble weighting agent, such as a metal powder like powdered iron or lead.

Oil Field Chemicals

It will be appreciated that a wide variety of oil field chemicals, especially oil well treating agents, can be incorporated in the weighted microcapsules of this invention.

All that is required is that the treating agent be dispersible in the water-immiscible solvent. The treating agent can be either suspended or dissolved in the solvent, and can be substantially water-insoluble as well as water-soluble. Where the produced flowing stream is predominantly an aqueous medium, the treating agent is preferably highly water-dispersible or water-soluble. However, the flowing stream or other aqueous medium can also contain another phase, such as an oil phase, and the treating agent can be partially soluble in the other phase.

The water-immiscible "carrier" solvent is preferably an inert solvent which does not attack the macro colloid or cause it to deteriorate and the treating agent should be stable in the solvent. While a wide variety of organic solvents can be used, the solvent should be at least partially immiscible with the aqueous phase under the conditions of the process, thereby making it possible to form a dispersed organic solvent phase containing the oil field chemical. For most purposes, an oil solvent will be particularly desirable, such as a hydrocarbon oil. For example, a hydrocarbon solvent such as kerosene is particularly suitable. Other hydrocarbon solvents like diesel fuel can be used. Other aliphatic or aromatic solvents, including mixtures thereof, are useful in certain applications as described in U.S. Pat. No. 3,574,132, incorporated herein by reference. It will be understood that the selection of the particular solvent is not critical, although an oil solvent is particularly desirable where the oil field chemical is oil-soluble, or where it is desired to introduce such chemical into a stream or other aqueous medium containing an oil phase.

The oil field chemicals include such materials as: (1) corrosion inhibitors to prevent the corrosive attack of metals on oil well equipment, such as, fatty amine salts, amido amines, imidazolines, diamine salts, polar organic compounds and quaternary ammonium comounds, e.g., cationic surfactants; (2) dispersants which act as solubilizing agents for paraffin, e.g., nonionic and anionic surfactants; (3) pour-point modifiers to inhibit the deposition of paraffinic material in the well tubing and moving parts of the equipment, usually long chain polymers and/or surface active materials; (4) emulsion breaking chemicals to hasten the separation of produced water from crude oil, such as, phenol-formaldehyde sulfonate, alkylphenol ethoxylates, diepoxides, sulfonates, resin esters, and polyglycols; and (5) acids or acid salts such as formic acid and sulfamic acid for the dissolution of calcium carbonate-containing formations. Also included are (6) scale inhibitors for preventing the deposition of scale in the wellbore and formation, such as phosphonates, polyacrylates and phosphate esters; (7) bactericides, like quaternary ammonium compounds and aldehydes such as coconut alkyl trimethylammonium salts and glutaraldehyde; and (8) asphaltene treatment chemicals, such as alkylphenol ethoxylates and aliphatic polyethers. All of the above and any other chemicals which find application in an oil well bore can be used.

The following is a representative list of the major chemical types used in oilfield production treating.

1. Scale Inhibitors: Phosphonic Acid types such as Monsanto's Dequest 2000, Dequest 2006, Dequest 2041, Dequest 2010, Dequest 2016, Dequest 2054; Mayo Chemical's Mayoquest 1320; Buchman Phos 2 and BL-2004; Champion's Product 39 and Product 78; and Lonza's Unihib 305 and Unihib 1704. The chemical and physical properties of Dequest 2000 and 2006 are as follows:

| DEQUEST ® 2000 Phosphonate (Acid) | |
|---|---|
| Structure: | 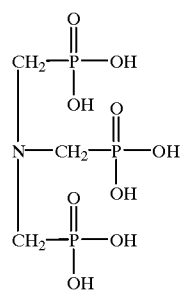 |
| Molecular Weight: | 299 |
| Chemical Name: | Aminotri(methylenephosphonic acid) |
| Abbreviation: | ATMP |
| Chemical Abstracts Name: | Phosphonic acid, nitrilotris(methylene)tri- |
| Chemical Form: | Aqueous Solution |
| Typical Analysis: | 50% (as acid) |
| Active Content | |
| Color | Pale yellow |
| Specific Gravity 20/15 | 1.3 |

| -continued | |
|---|---|
| DEQUEST ® 2000 Phosphonate (Acid) | |
| pH 1% solids solution at 25° C. | <2 |
| Iron as Fe | <35 ppm |
| Chloride (Cl) | <1% |
| Viscosity (cps) | |
| at 20° C. | 36.5 |
| at 60° C. | 15.0 |
| Viscosity (cps) | |
| at 20° C. | 11.08 |
| at 40° C. | 6.10 |
| at 60° C. | 3.85 |

| DEQUEST ® 2006 Phosphonate (Na Salt) | |
|---|---|
| Structure: | 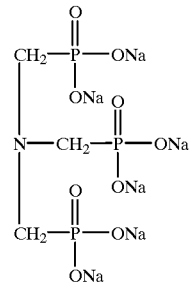 |
| Molecular Weight: | 409 |
| Chemical Name: | Aminotri(methylenephosphonic acid), pentasodium salt |
| Abbreviation: | Na$_5$ ATMP |
| Chemical Abstracts Name: | |
| Chemical Form: | Aqueous Solution |
| Typical Analysis: | 30% (as acid) |
| Active Content | 40% (as Na$_5$ Salt) |
| Color | Yellow |
| Specific Gravity 20/15 | 1.4 |
| pH 1% solids solution at 25° C. | 10–11 |
| Iron as Fe | <35 ppm |
| Chloride (Cl) | <1% |
| Viscosity (cps) | |
| at 20° C. | 204 |
| at 60° C. | 21 |
| Viscosity (cps) | |
| at 20° C. | 57.51 |
| at 40° C. | 11.37 |
| at 60° C. | 7.66 |

2. Scale Inhibitors: Phosphate Ester types such as BASF's Pluradyne SI-70; Champion's Product 81; and Witco's SI-3065.
3. Polyacrylate and Polyacrylamide types of Scale Inhibitors or Dispersants such as Johnston Polymer J-Poly Series; National Starch's Aquatreat 655, Aquatreat 700, and AR-978; and Baker's Polymer 214.
4. Scale Ihibitors for Deposit Control, Polysulfonated Polycarboxylates such as National Starch's Versa-TL4.
5. Corrosion Inhibitors: Imidazolines and Amidoamines such as BASF's Pluradyne CI-1019 and CI-1020; Witco's Witcamine 209; and Jetco's WT-3276, CI-3222, CI-3224, and CI-3254.

6. Salting Agents for Corrosion Inhibition: Dimer-Trimer Acid Salts such as Union Camp's Century D-75; Henkel's Versatryrne 213; and Westvaco's DTC-195 and Tenax 2010.
7. Corrosion-Biocide-Surfactants: Quaternary Ammonium Compounds such as Jetco's Jet Quat Series of Fatty Tri-Methyl, Di-Fatty Di-Methyl, and Di-Quat Quaternary Ammonium Chlorides and Alkylpyridine Quats such as Champion Product 59.
8. Corrosion-Biocide-Surfactants: Primary, Secondary, and Tertiary Amines such as are available from Jetco and include Jet Amine PC, Jet Amine PS and PT, and Jet Amine DMCD.
9. Chemicals to limit the presence of solid hydrocarbon deposits such as paraffins and asphaltenes, including Paraffin Dispersants and Inhibitors, e.g., Solvents and Paraffin Crystal Modifiers such as Jet Base PT-3199.
10. $H_2S$ and $O_2$ Scavengers such as Caustics, Nitrites, Formalin, and Sulfites.
11. Demulsifiers.
12. Biocides.
13. Clay Stabilizers.
14. Surfactants, including Foaming Agents such as Jet Foam MF-450.
15. Acidizing Agents and Mutual Solvents As previously indicated, this invention has particular application to the encapsulation and use of oil field chemicals which have scale inhibition properties or corrosion inhibition properties, or biocide, e.g., bactericidal, properties. More particularly, the encapsulated product containing a corrosion inhibitor desirably has corrosion inhibition properties when applied to a metal surface, such as a ferrous metal surface. Also, when biocide/bactericidal properties are desired, the chemical should usually be water-soluble and should manifest the bactericidal properties in aqueous solution.

Nitrogen compounds which are bactericidal include those which contain at least one nitrogen atom, and at least one aliphatic chain of from 12 to 22 carbon atoms, such as the aliphatic chains derived from natural fats and oils. For example, the aliphatic chain will preferably contain from 12 to 18 carbon atoms, when it is produced from most common animal fats or vegetable oils. The aliphatic amine, such as the primary amines, or aliphatic diamines, are particularly preferred, although the nitrogen of the compound can be in the form of a primary amine, secondary amine, tertiary amine, diamine or quarternary. A specific example of a bactericide is cocoamine acetate, or cocodiamine acetate.

Hydroxamic acids, such as oleyl hydroxamic acid, can be utilized as corrosion inhibitors. One particularly suitable corrosion inhibitor for oil well application is tallow trimethylene diamine dinaphthenate. Other specific examples of corrosion inhibitors and/or bactericides are cocodiamine adipate, trimethylalkyl ammonium chloride, or dimethyl dialkyl ammonium chloride, where the alkyl groups are derived from a natural fat source such as tallow, coconut oil, or cottonseed oil. Cyclic nitrogen compounds can also be used, such as imidazoline compounds, particularly quaternized imidazolines.

Other examples of bactericides that can be used are glutaraldehyde, formaldehyde, 2-bromo-2-nitropropane-1, 3-diol sold by Inolex Chemicals under the trade name, Bronopol, and a mixture of 5-chloro-2-methyl-4-isothiazolin-3-one and 2-methyl-4-isothiazoline-3-one sold by Rohm and Haas Company under the trade name, Kathon CG/ICP. Typical levels of bactericides used in the present compositions are from about 1 to about 1,000 ppm by weight of the composition.

The amount of oil field chemical incorporated in the microcapsules can be from as low as about 5% by weight of the microcapsules and can constitute up to as much as about 80% by weight, preferably from about 5% to about 25%.

The microcapsules are typically used suspended as a slurry at a level of from about 10% to about 80%, preferably from about 20% to about 75%, more preferably from about 30% to about 50%, in the salt supernatant liquid used to form the microcapsules. This concentrated slurry is introduced into the well. Once the microcapsules are formed, mixtures of different encapsulated oil field chemicals can be premixed to simplify treatment in the field. Especially useful are mixtures of at least two of scale inhibitors, corrosion inhibitors, and/or biocides.

Oil Well Treatment

There are a number of advantages in using microencapsulated chemicals. A primary advantage is the ability to extend the treatment over a period of time to avoid the need for frequent treatments. Also, when two or more chemicals are used in a well treatment, the encapsulated forms of the chemicals can be mixed without losing product or encountering a failure due to premature reactions. As the encapsulating material dissolves downhole, the various chemical or chemicals start to work where they are intended to be effective.

Other advantages in using microencapsulated chemicals include longer residual effects of the chemical treatment, safer handling of the chemicals, simpler equipment required for well treatment, reduced costs due to more effective control and lower chemical consumption.

The microcapsules containing the oil field chemical are usually introduced into the oil well bore and/or subterranean formation in a treatment fluid which can comprise, e.g., water, oil, xylene, toluene, brines, water-in-oil emulsions or oil-in-water emulsions. The amount of oil field chemical required for a successful treatment will vary widely. However, from about 10 to about 100 kg of chemical per 100 barrels of treatment fluid will be sufficient for most applications.

All percentages, ratios, and parts herein are by weight unless otherwise indicated.

EXAMPLE I

Scale Inhibitor Capsule

To 126.7 grams water add 23.8 grams diammonium sulfate crystals and 47.5 grams of a 35–45% solution of an aminopolycarboxylic acid salt (tetrasodium ethylenediaminetetraacetic acid—"Tetrasodium EDTA") and mix until homogenous. This is solution "A."

To 48.6 grams of water add 2.34 grams type B 225 gelatin and dissolve the gelatin at 140.degree. F. Then, add 18.75 grams barium sulfate (or other heavy metal weighting agents such as lead oxide or iron oxide). With stirring adequate to ensure complete dispersion, add 10.5 grams of scale inhibitor base (UNIHIB 1704, a polyhexelene polyamino polymethylene phosphonic acid). Next, add 1.17 grams diethylenetriamine and 1.17 grams hydrochloric acid solution. To this mixture, add a combination of 11.56 grams of primary coco amine (JET AMINE PC) and 4.9 grams of a petroleum hydrocarbon of 0 to 16 carbon chain (kerosene). The pH of this emulsion is adjusted to 2.9 to 4.2 with hydrochloric acid and comprises Solution "B." Solutions "B" and "A" are combined with agitation resulting in the desired active coacervate microcapsules which settle to the bottom as a freely dispersible suspension.

EXAMPLE II

Corrosion Inhibitor Capsule

To 99.9 grams water, add 18.7 grams diammonium sulfate and 50.8 grams of aminopoly carboxylic acid (VERSENE 100). Mix completely and label solution "A." In another vessel, combine 91.4 grams water, 3 grams type B 225 gelatin, 18.1 grams barium sulfate, and 16.8 grams of amidoamine corrosion inhibitor concentrate (JET BASE CI3220) with agitation necessary to ensure a homogenous emulsion. Adjust the pH to 2.9 to 4.2 with 1.3 grams hydrochloric acid and this comprises solution "B." Solutions "B" and "A" are combined with agitation to produce the desired active coacervate microcapsules which settle to the bottom as a freely dispersible suspension. The microcapsules are between about 20% and about 40% of the mixture.

EXAMPLE III

Phosphate Ester Scale Inhibitor Capsule

To 125.5 grams water add 24.95 grams diammonium sulfate crystal and 47.5 grams of a 39% solution of tetrasodium EDTA; mix until homogenous. This is Solution "A." Prepare a stable emulsion by mixing together the following: 48.6 grams water, 2.34 grams gelatin type B 225, 18.75 grams barite, 10.55 grams phosphate ester (BASF PLURA-DYNE SI-70), 0.55 grams diethylenetriamine, 0.62 grams water, 2.85 grams muriatic acid, 16.6 grams of a combination of 70% Jet Amine PC and 30% kerosene. This emulsion is Solution "B." Combine Solutions "A" and "B" together with agitation to form freely dispersible microcapsules which will settle to the bottom. The microcapsules are between about 20% and about 50% of the mixture.

The above formulas are prepared using ratios of ammonium sulfate (20% solution) to tetrasodium EDTA (23% solution) of from about 90:10 to about 50:50. The above microcapsules are also prepared with the following aminopolycarboxylic acids: VERSENE 100, VERSENE 80, VERSENE 120 and VERSENE Tetraammonium EDTA. The preferred stabilizer is VERSENE 100.

The microcapsules are prepared with the following scale inhibitor actives: ATMP and DETA phosphonates.

When the microcapsules of the above examples are placed in brine solutions containing about 20,000 mg/1ppm chloride ion, there is little or no turbidity observed, demonstrating stability for at least a month. When microcapsules prepared as above, but without the aminopolycarboxylic acid (strong chelating agent) are placed in the same brine solution, turbidity is seen immediately, demonstrating the lack of stability.

A 50:50 mixture of the slurry of Example II and the slurry of Example III is prepared. Similarly, 50:50 mixtures of a biocide microcapsule with each of the microcapsules of Examples II and III are prepared. Also a 1:1:1 mixture of corrosion inhibitor, scale inhibitor, and biocide microcapsules is prepared.

What is claimed is:

1. A microcapsule containing from about 5% to about 80% of oil field chemical selected from the group consisting, of:
   (A) scale inhibitor;
   (B) corrosion inhibitor;
   (C) biocide;
   (D) chemicals to limit the presence of solid hydrocarbons;
   (E) scavengers for $H_2S$ and/or $O_2$;
   (F) demulsifier;
   (G) clay stabilizer;
   (H) surfactant;
   (I) acidizing agent; and
   (J) mixtures thereof, said microcapsules having a wall comprising
   a gelatin;
   an effective amount of weighting agent;
   an effective amount of a chelating agent selected from the acids and salts consisting of:
   (1) a compound having the generic formula:

$R^5$—[O—CH(COOH)CH(COOH)]$_n$$R^5$ wherein each $R^5$ is selected from the group consisting of H and OH and n is a number from about 2 to about 3 on the average;
   (2) a compound having the generic formula:

R—N(CH$_2$COOH)$_2$ wherein R is selected from the group consisting of:
   —CH$_2$CH$_2$CH$_2$OH; —CH$_2$CH(OH)CH$_3$;
   —CH$_2$CH(OH)CH$_2$OH; —CH(CH$_2$OH)2;
   —CH$_3$; —CH$_2$CH$_2$OCH$_3$; —CO—CH$_3$;
   —CH$_2$—CO—NH$_2$; —CH$_2$CH$_2$CH$_2$OCH$_3$;
   —C(CH$_2$OH)$_3$; and mixtures thereof;
   (3) nitrilotriacetic acid;
   (4) ethylenediamine and polyethylenediamine polyacetic acids; and
   (5) mixtures thereof.

2. The microcapsule of claim 1 wherein the effective amount of the weighting agent is from about 5 percent to about 75 percent by weight.

3. The microcapsule of claim 2 wherein the weighting agent is a barium salt.

4. The microcapsule of claim 1 where in the effective amount of the weighting agent is from about 10 percent to about 50 percent by weight.

5. The microcapsule of claim 4 wherein the weighting agent a barium salt.

6. The microcapsule of claim 1 wherein the wall is formed by precipitating the gelatin with at least one salt selected from the group consisting of sodium sulfate, ammonium sulfate and mixtures thereof.

7. A mixture of microcapsules comprising
   a first microcapsule defined by claim 1 which contains an a first oil field chemical;
   a second microcapsule defined by claim 1 which contains a second oil field chemical that is different from the first oil field chemical.

8. The mixture of microcapsules of claim 7 wherein the first and second microcapsules contain different oil chemicals selected from the group consisting of corrosion inhibitors, scale inhibitors and biocides.

9. A composition comprising a slurry of microcapsules at a level from about 10 percent to about 80 percent by weight in the supernatant liquid used to form the microcapsules, the microcapsules defined by claims 1, 6, 7 or 8.

10. A method of treating an oil well, comprising the step of:
   treating an oil well having high levels of brine and/or heavy metals with a composition of microcapsules that is defined by claims 1, 6, 7 or 8, the treating provided for a period of time of at least about one month.

11. A method of treating an oil well, comprising the step of:
   treating an oil well having high levels of brine and/or heavy metals with a composition of microcapsules that is defined by claim 9, the treating provided for a period of time of at least about one month.

* * * * *